United States Patent
Sonobe et al.

(10) Patent No.: US 8,003,237 B2
(45) Date of Patent: Aug. 23, 2011

(54) PERPENDICULAR MAGNETIC RECORDING DISK AND MANUFACTURING METHOD THEREOF

(75) Inventors: Yoshiaki Sonobe, Shinjuku-ku (JP); Teiichiro Umezawa, Shinjuku-ku (JP); Kong Kim, Shinjuku-ku (JP); Masaki Uemura, Shinjuku-ku (JP)

(73) Assignee: WD Media, Inc., San Jose, CA (US)

( * ) Notice: Subject to any disclaimer, the term of this patent is extended or adjusted under 35 U.S.C. 154(b) by 266 days.

(21) Appl. No.: 11/909,598

(22) PCT Filed: Mar. 20, 2006

(86) PCT No.: PCT/JP2006/305538
§ 371 (c)(1),
(2), (4) Date: Sep. 24, 2007

(87) PCT Pub. No.: WO2006/101072
PCT Pub. Date: Sep. 28, 2006

(65) Prior Publication Data
US 2009/0081483 A1    Mar. 26, 2009

(30) Foreign Application Priority Data
Mar. 24, 2005    (JP) ................................ 2005-086220

(51) Int. Cl.
*G11B 5/66* (2006.01)
(52) U.S. Cl. ........................................................ 428/828
(58) Field of Classification Search .................. None
See application file for complete search history.

(56) References Cited

U.S. PATENT DOCUMENTS

| | | | | |
|---|---|---|---|---|
| 5,851,643 A | * | 12/1998 | Honda et al. | 428/212 |
| 6,815,082 B2 | * | 11/2004 | Girt | 428/828.1 |
| 7,033,686 B2 | * | 4/2006 | Hirayama et al. | 428/832 |
| 7,550,211 B2 | * | 6/2009 | Osawa et al. | 428/831 |
| 2004/0247945 A1 | * | 12/2004 | Chen et al. | 428/694 TS |
| 2005/0019608 A1 | * | 1/2005 | Kim et al. | 428/694 BS |

FOREIGN PATENT DOCUMENTS

| | | |
|---|---|---|
| JP | 10149526 A | 6/1998 |
| JP | 2001256640 A | 9/2001 |
| JP | 200225030 A | 1/2002 |
| JP | 2002133645 A | 5/2002 |
| JP | 2002334424 A | 11/2002 |

(Continued)

OTHER PUBLICATIONS

T. Oikawa et al., "Microstructure and Magnetic Properties of CoPtCr-SiO2 Perpendicular Recording Media", IEEE Transactions on Magnetics, Sep. 2002, pp. 1976-1978, vol. 38, No. 5.

(Continued)

*Primary Examiner* — Holly Rickman

(57) ABSTRACT

A magnetic disk 10 for use in perpendicular magnetic recording, which includes an underlayer 18, a size-reduction promoting layer 20 (nonmagnetic granular layer) of a granular structure, and a magnetic recording layer 22 having a ferromagnetic layer 32 of a granular structure. The size-reduction promoting layer 20 has an inorganic oxide matrix and nonmagnetic metal crystal grains and is disposed between the underlayer 18 and the ferromagnetic layer 32, thereby reducing the size of magnetic crystal grains in the ferromagnetic layer 32.

13 Claims, 2 Drawing Sheets

FOREIGN PATENT DOCUMENTS

| | | |
|---|---|---|
| JP | 2003123245 A | 4/2003 |
| JP | 2004220737 A | 8/2004 |
| JP | 2004296030 A | 10/2004 |
| JP | 2004310910 A | 11/2004 |
| JP | 2005322384 A | 11/2005 |
| JP | 2006185511 A | 7/2006 |
| JP | 2006101072 A1 | 9/2006 |

OTHER PUBLICATIONS

Y. Sonobe et al,, "Thermal Stability and SNR of Coupled Granular/Continuous Media", IEEE Transactions on Magnetics, Jul. 2001, pp. 1667-1670, vol. 37, No. 4.

Japanese Office Action corresponding to Japanese Patent Application No. 2005-086220, dated Mar. 2, 2010.

* cited by examiner

[Fig. 1]
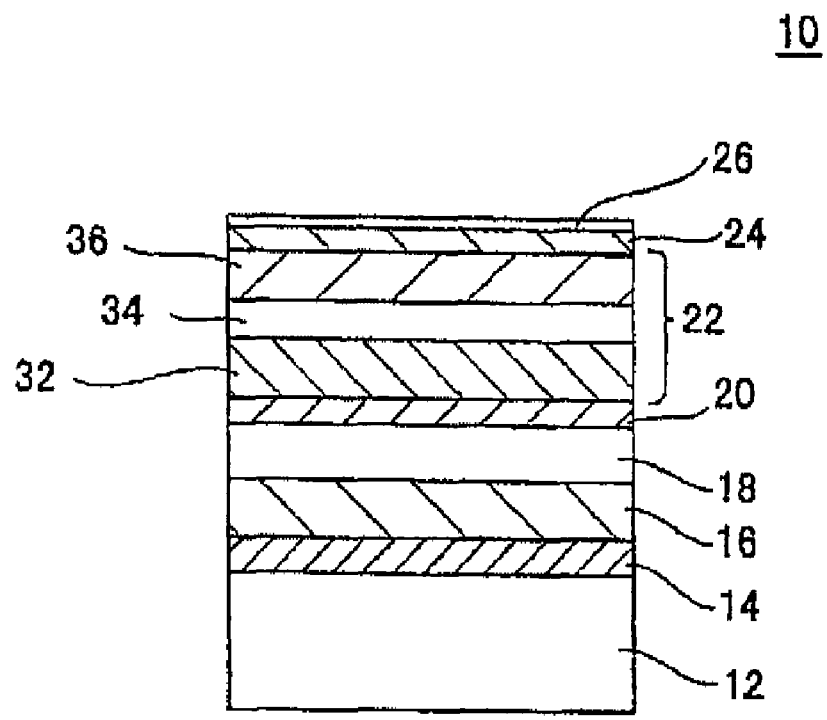
[Fig. 2]
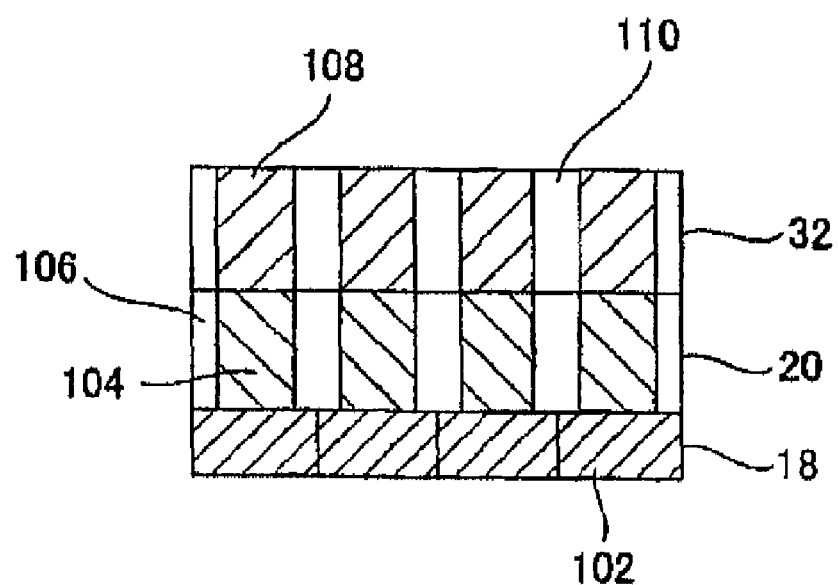

[Fig. 3]
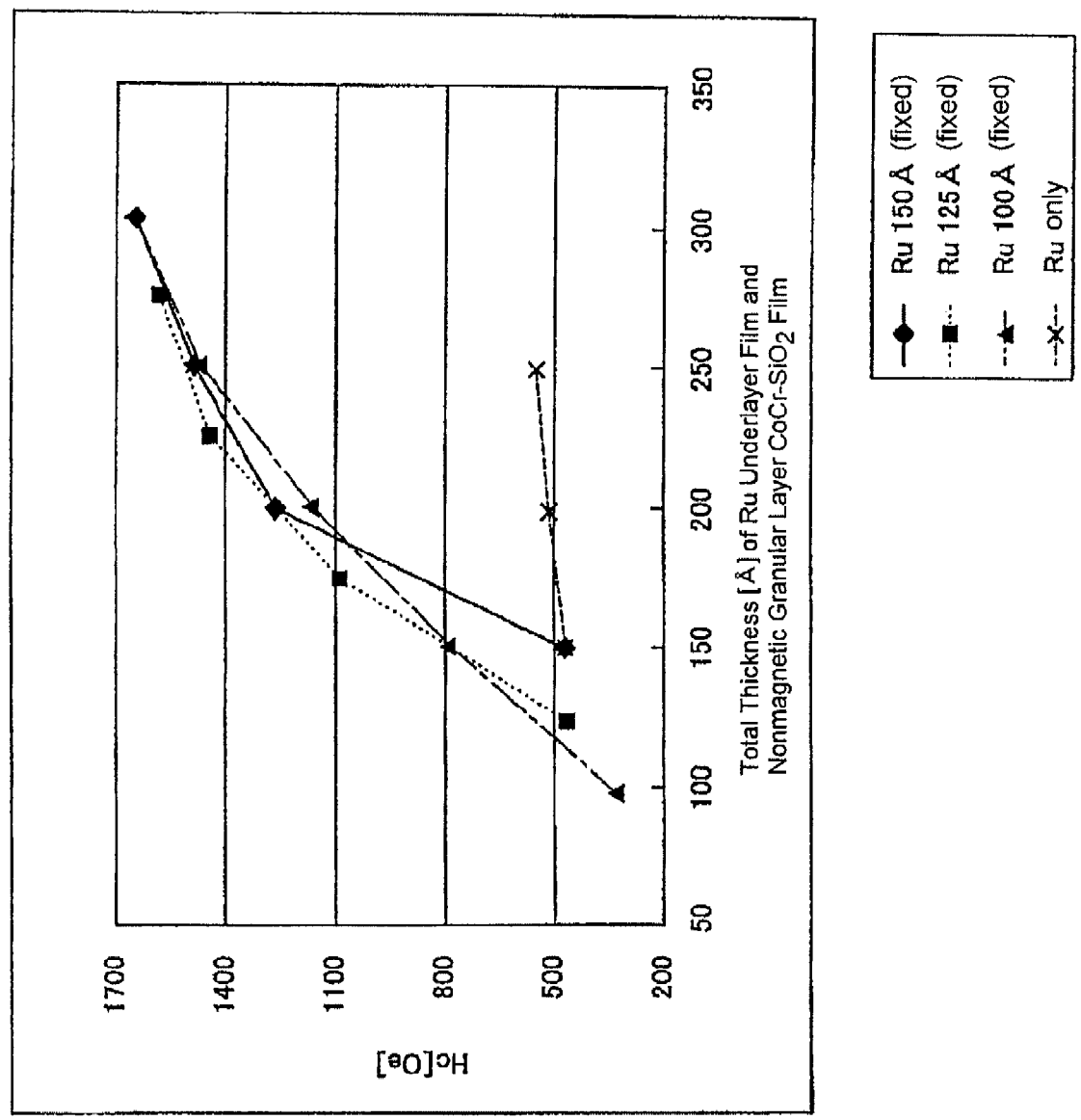

PERPENDICULAR MAGNETIC RECORDING DISK AND MANUFACTURING METHOD THEREOF

TECHNICAL FIELD

This invention relates to a magnetic disk adapted to be mounted in a perpendicular magnetic recording type HDD (hard disk drive) or the like and to a manufacturing method thereof.

BACKGROUND ART

In recent years, the information-oriented society has continued the rapid advance and the information recording capacity exceeding 60 Gbytes has been required per 2.5-inch magnetic disk in magnetic recording apparatuses represented by HDDs (hard disk drives). In order to obtain a magnetic disk satisfying such a requirement, it is necessary to realize an information recording density exceeding 100 Gbits per $inch^2$ (100 $Gbits/inch^2$). For stably performing recording/reproduction with respect to such a high recording density magnetic disk, it is preferable to employ a perpendicular magnetic recording system as a magnetic recording/reproducing system.

For use in the perpendicular magnetic recording system, a $CoCrPt—SiO_2$ (hereinafter abbreviated as $CCP—SiO_2$) perpendicular magnetic recording medium and a CGC perpendicular medium both of which exhibit high thermal stability and excellent recording characteristics have been proposed as magnetic recording media in Non-Patent Documents 1 and 2. Herein, Non-Patent Documents 1 and 2 are contributed by T Oikawa et al. to IEEE Transactions on Magnetics, vol. 38, 1976-1978 (2002) and by Y. Sonobe et al. to IEEE Transactions on Magnetics, vol. 37, 1667-1670 (2001), respectively. In addition, CGC is an abbreviation of Coupled Granular/Continuous and, as described in Non-Patent Document 2, this perpendicular medium is formed by a combination of an exchange-coupled continuous layer for obtaining high thermal stability and a granular CoCrPt layer for noise reduction.

Further, Japanese Unexamined Patent Application Publication (JP-A) No. 2002-334424 (Patent Document 1), Japanese Unexamined Patent Application Publication (JP-A) No. 2003-123245 (Patent Document 2), or the like propose a perpendicular magnetic recording medium which uses a $Ru—SiO_2$ underlayer in combination with the technique described in the foregoing Non-Patent Document 1 or 2 in order to improve the S/N ratio. In the film forming process shown in Patent Document 1 or 2, a high Ar gas pressure sputtering process is normally used for the purpose of reducing the size of magnetic grains.

DISCLOSURE OF THE INVENTION

Problem to be Solved by the Invention

Improvement of the recording density is mainly accomplished by reducing noise in a magnetization transition region within a magnetic recording layer. For the noise reduction, it is necessary to improve the crystal orientation of the magnetic recording layer or reduce the crystal grain size and the magnitude of magnetic interaction.

With respect to the $CCP—SiO_2$ perpendicular magnetic recording medium described in Non-Patent Document 1, a size of magnetic grains is reduced by using the high Ar gas pressure sputtering process. Simultaneously, $SiO_2$ is segregated at the grain boundaries to reduce the magnetic interaction between the crystal grains of a magnetic recording layer. The crystal grain size and the magnitude of the magnetic interaction are affected by the thickness of $SiO_2$ segregated at the grain boundaries. By increasing the amount of $SiO_2$, the S/N ratio in high density recording is improved. On the other hand, degradation occurs in perpendicular magnetic anisotropy when the amount of $SiO_2$ is increased. This causes degradation in thermal stability and increase in noise. Further, as shown in Non-Patent Document 1 or 2, since the high Ar gas pressure sputtering process is used, there occur degradation in orientation of the magnetic recording layer and degradation in a surface property of a medium.

On the other hand, it has been found that there are limitations about miniaturizing magnetic crystal grains only by adopting the CGC structure as the magnetic recording layer like the $CGC-SiO_2$ perpendicular medium described in Non-Patent Document 2.

It is an object of this invention to provide a magnetic disk and its manufacturing method that can reduce the size of magnetic crystal grains to an extent such that it is possible to realize an information recording density exceeding 10 Gbits (100 $Gbits/inch^2$).

Means for Solving the Problem

As a result of continuing studies to solve the foregoing problems, the present inventors have completed the following invention. For solving the foregoing problems, this invention has the following structures.

(Structure 1) A perpendicular magnetic recording disk for use in perpendicular magnetic recording, said perpendicular magnetic recording disk comprising a base, an underlayer formed over said base for controlling a crystal orientation of an upper layer, a nonmagnetic granular layer of a granular structure formed on said underlayer, and a magnetic recording layer comprising a ferromagnetic layer of a granular structure formed on said nonmagnetic granular layer, wherein said nonmagnetic granular layer comprises an inorganic oxide matrix and nonmagnetic metal crystal grains which are dispersed in said matrix of said nonmagnetic granular layer and which have a crystal orientation directed in a predetermined orientation that depends on a crystal orientation of said underlayer and said ferromagnetic layer comprises an inorganic oxide matrix and magnetic crystal grains which are dispersed in said matrix of said ferromagnetic layer and which have an easy magnetization axis directed in a predetermined orientation that depends on the crystal orientation of said metal crystal grains.

If, for example, a ferromagnetic layer is formed directly on an underlayer without using a nonmagnetic granular layer, since magnetic crystal grains can grow from any positions on the underlayer, there is a case where a disturbance occurs in distribution of the magnetic crystal grains, for example, near the interface with the underlayer. In this case, for example, there is a possibility that the magnetic crystal grains increase in size near the interface with the underlayer, so that the magnetic interaction occurs between the magnetic crystal grains. Further, when forming the ferromagnetic layer directly on the underlayer, there is a case where it is necessary to use a high Ar gas pressure sputtering process in which the Ar gas pressure is raised. In the case where the high gas pressure sputtering process is used, there is a possibility of occurrence of degradation in orientation of a magnetic recording layer, degradation in medium surface properties, or the like.

On the other hand, according to Structure 1, the metal crystal grains in the nonmagnetic granular layer are substantially uniformly distributed near the interface with the ferromagnetic layer even if a disturbance occurs in distribution thereof near the interface with the underlayer. Therefore, with this structure, it is possible to improve the crystal orientation of the magnetic crystal grains in the ferromagnetic layer and to properly reduce the size of the magnetic crystal grains.

Further, by causing the layer between the underlayer and the ferromagnetic layer to be nonmagnetic, it is possible to prevent occurrence of influence on the magnetism of the ferromagnetic layer. Note that nonmagnetic includes, in addition to a completely nonmagnetic case, a case of having a magnetism that is weak enough not to cause a problem on the function of the magnetic disk. The nonmagnetic granular layer, for example, may have a magnetism that is weak enough to be ignored as compared with the ferromagnetic layer.

Further, since there is provided a segregated state where the individual magnetic crystal grains are magnetically segregated by the inorganic oxide matrix, it is possible to reduce the magnetic interaction between the magnetic crystal grains. Therefore, it is possible to reduce noise in a magnetization transition region of the magnetic recording layer (medium noise) by the reduction in magnetic interaction. Further, the S/N ratio of the magnetic disk can be improved.

Further, according to Structure 1, the nonmagnetic granular layer and the ferromagnetic layer can be formed by a low-temperature process. Therefore, it is possible to prevent degradation in orientation of the magnetic recording layer, degradation in medium surface properties, and so on.

For controlling the distribution and size of magnetic crystal grains, it may be considered, for example, to make an underlayer have a granular structure and to form a ferromagnetic layer on the underlayer. However, the underlayer being a layer to serve as a crystal orientation control layer is required to be formed thicker than a nonmagnetic granular layer in order to exert a crystallographically sufficient influence on the crystal orientation of the upper layer. Therefore, even if the underlayer has the granular structure, the distance between metal crystal grains becomes too large and, thus, it is difficult to properly reduce the size of the magnetic crystal grains.

Further, it may be considered to form a nonmagnetic granular layer and a ferromagnetic layer by a segregated structure in which, for example, a CoCr alloy, a CoCrPt (i.e. CCP) alloy, or the like is compositionally separated. However, in this case, it is necessary to form the nonmagnetic granular layer and the ferromagnetic layer by a high-temperature process in order to cause the occurrence of compositional separation. When the ferromagnetic layer and so on are formed by the high-temperature process, there is a possibility of occurrence of degradation in orientation of a magnetic recording layer, degradation in medium surface properties, or the like.

On the other hand, according to Structure 1, the magnetic crystal grains can be properly reduced in size using a low-temperature process at a temperature lower than that in which cobalt and chromium cause layer separation. Therefore, it is possible to prevent degradation in orientation of the magnetic recording layer, degradation in medium surface properties, and so on.

(Structure2) A perpendicular magnetic recording disk for use in perpendicular magnetic recording, said perpendicular magnetic recording disk comprising a base, an underlayer formed over said base for controlling a crystal orientation of an upper layer, a nonmagnetic granular layer of a granular structure formed on said underlayer, and a magnetic recording layer comprising a ferromagnetic layer of a granular structure formed on said nonmagnetic granular layer, wherein said nonmagnetic granular layer comprises a matrix containing silicon or silicon oxide and nonmagnetic metal crystal grains which are dispersed in said matrix of said nonmagnetic granular layer and which have a crystal orientation directed in a predetermined orientation that depends on a crystal orientation of said underlayer and said ferromagnetic layer comprises a matrix containing silicon or silicon oxide and magnetic crystal grains which are dispersed in said matrix of said ferromagnetic layer so as to be contacted with said metal crystal grains in said nonmagnetic granular layer and which have an easy magnetization axis directed in a predetermined orientation that depends on the crystal orientation of said metal crystal grains.

With this structure, it is possible to obtain the same effect as that of Structure 1. The silicon oxide is, for example, $SiO_2$. Herein, although it is recited that the nonmagnetic granular layer forms a matrix containing silicon or silicon oxide, use may be made, other than the silicon oxide, titanium oxide (TiO), chromium oxide ($Cr_2O_3$), or the like being a material having no solid solubility with CoCr.

(Structure 3) The underlayer is formed by a layer containing at least ruthenium (Ru), said matrix of said nonmagnetic granular layer contains at least silicon oxide, said metal crystal grains of said nonmagnetic granular layer are crystal grains containing at least cobalt (Co) and chromium (Cr), said matrix of said ferromagnetic layer contains at least silicon oxide, and said magnetic crystal grains of said ferromagnetic layer are crystal grains containing at least cobalt. With this structure, the underlayer, the nonmagnetic granular layer, and the ferromagnetic layer can be properly formed.

Further, with this structure, the Co alloy crystal grains being the magnetic crystal grains of the ferromagnetic layer mainly grow on the CoCr crystal grains being the metal crystal grains of the nonmagnetic granular layer. The silicon oxide being the matrix of the ferromagnetic layer mainly grows on the silicon oxide being the matrix of the nonmagnetic granular layer.

Therefore, Ru of the underlayer, CoCr of the nonmagnetic granular layer, and the Co alloy of the ferromagnetic layer are crystallographically coupled to each other. Further, the crystal orientation of the Co alloy of the ferromagnetic layer is controlled by Ru of the underlayer and CoCr of the nonmagnetic granular layer. Therefore, with this structure, the thickness of Ru of the underlayer can be reduced. Further, this makes it possible to significantly reduce the cost of the magnetic disk. The nonmagnetic granular layer is, for example, a nonmagnetic CoCr—$SiO_2$ layer. The ferromagnetic layer is, for example, a CCP—$SiO_2$ magnetic layer.

Further, by interposing the nonmagnetic CoCr—$SiO_2$ layer between the underlayer and the CCP—$SiO_2$ magnetic layer, the magnetic crystal grains can be properly reduced in size. Further, by segregating $SiO_2$ between the magnetic crystal grains, the S/N ratio can be improved.

Moreover, with this structure, the nonmagnetic granular layer and the ferromagnetic layer can be formed by a low Ar gas pressure sputtering process. Using the low Ar gas pressure sputtering process, it is possible to suppress degradation in medium surface roughness caused in the magnetic disk. Further, this makes it possible to manufacture the magnetic disk that can achieve stable head flight. The low Ar gas pressure sputtering process is a sputtering process that is performed, for example, at an Ar gas pressure of 1 to 20 mTorr and preferably at an Ar gas pressure of 2 to 10 mTorr.

(Structure 4) The underlayer is a layer in which at least one kind of substance selected from $SiO_2$, $Al_2O_3$, $ZrO_2$, and $Cr_2O_3$ is added to ruthenium. With this structure, the metal crystal grains in the nonmagnetic granular layer can be reduced in size. Further, by this, the magnetic crystal grains in the ferromagnetic layer can be reduced in size more properly.

(Structure 5) The metal crystal grains of said nonmagnetic granular layer are crystal grains containing at least one kind of element selected from the group consisting of B, Ta, Nb, and Ru, cobalt, and chromium.

(Structure 6) The matrix of said nonmagnetic granular layer contains at least silicon and the content of silicon in said nonmagnetic granular layer is 4 at % to 20 at %.

(Structure 7) The matrix of said ferromagnetic layer contains at least silicon and the content of silicon in said ferromagnetic layer is 8 at % to 15 at %.

(Structure 8) The matrix of said nonmagnetic granular layer and said matrix of said ferromagnetic layer contain at least silicon and, when the content of silicon in said nonmagnetic granular layer is A at % and the content of silicon in said ferromagnetic layer is B at %, A/B, a ratio of A to B, falls within a range of 0.7 to 1.5.

According to Structures 5 to 8, the ferromagnetic layer can be properly formed on the nonmagnetic granular layer. Further, the magnetic crystal grains of the ferromagnetic layer can be properly reduced in size.

Herein, if the content of silicon in the ferromagnetic layer is less than 8 at %, the effect of reducing the medium noise is small and thus the S/N ratio in high density recording cannot be sufficiently improved. On the other hand, if it is more than 15 at %, degradation starts to occur in perpendicular magnetic anisotropy and, following it, there occur degradation in thermal stability and increase in DC noise in high density recording. For the same reason, the content of silicon in the ferromagnetic layer is more preferably 10 to 15 at %. The thickness of the ferromagnetic layer is preferably 20 nm or less and more preferably 8 to 16 nm.

The thickness of the nonmagnetic granular layer is preferably 2 to 30 nm and more preferably 5 to 20 nm. Further, the content of silicon in the nonmagnetic granular layer is 4 to 20 at % and preferably 10 to 15 at %. With this structure, the ferromagnetic layer can be properly grown on the nonmagnetic granular layer.

(Structure 9) An amorphous seed layer is provided between said base and said underlayer.

(Structure 10) An amorphous soft magnetic layer is provided between said base and said underlayer.

(Structure 11) The base is an amorphous glass.

With Structures 9 to 11, the magnetic disk for use in perpendicular magnetic recording can be properly manufactured.

(Structure 12) The magnetic recording layer further comprises an exchange energy control layer which has an easy magnetization axis aligned substantially in the same direction as that of said ferromagnetic layer. The magnetic recording layer may further comprise a magnetic coupling control layer formed on the ferromagnetic layer. The exchange energy control layer may be formed on the magnetic coupling control layer.

The exchange energy control layer has magnetically coupled crystal grains therein and is magnetically coupled to the ferromagnetic layer while being adjacent to the ferromagnetic layer or through the magnetic coupling control layer. By this magnetic coupling, the exchange energy control layer aligns easy magnetization axes of the mutual layers substantially in the same direction.

In terms of the ferromagnetic layer made of the Co-based magnetic material, it is preferable that, specifically, the exchange energy control layer be in the form of alternate-layered films of cobalt (Co) or an alloy thereof and palladium (Pd) or alternate-layered films of cobalt (Co) or an alloy thereof and platinum (Pt).

Since the alternate-layered films made of such materials have large magnetic Ku, the domain wall width in the exchange energy control layer can be reduced. The thickness thereof is preferably 1 to 8 nm and more preferably 2 to 5 nm. Even when use is made of CoCrPt containing a large amount of Pt, CoPt, CoPd, FePt, $CoPt_3$, or $CoPd_3$ as a material of the exchange energy control layer instead of the foregoing multilayer film, the same effect can be obtained.

Further, in order to achieve suitable perpendicular magnetic recording properties based on exchange coupling, it is necessary to set a proper thickness ratio between the ferromagnetic layer and the exchange energy control layer such that when the thickness of the ferromagnetic layer is increased, the thickness of the exchange energy control layer is increased, or when the thickness of the ferromagnetic layer is reduced, the thickness of the exchange energy control layer is reduced. Given that the thickness of the ferromagnetic layer is A and the thickness of the exchange energy control layer is B, A/B, a ratio of A to B, is preferably in the range of 2 to 5 and more preferably 3 to 4.

Further, the magnetic coupling control layer is preferably provided between the ferromagnetic layer and the exchange energy control layer. By providing the magnetic coupling control layer, the exchange coupling between the ferromagnetic layer and the exchange energy control layer can be suitably controlled. As the magnetic coupling control layer, use is preferably made of, for example, a Pd layer or a Pt layer. The thickness thereof is preferably 2 nm or less and more preferably in the range of 0.5 to 1.5 nm. The ferromagnetic layer and the exchange energy control layer are disposed adjacent to each other or through the magnetic coupling control layer interposed therebetween and it is preferable to dispose the exchange energy control layer above the ferromagnetic layer as seen from the base.

(Structure 13) A manufacturing method of a magnetic disk for use in perpendicular magnetic recording, said manufacturing method comprising forming, over a base, an underlayer for controlling a crystal orientation of an upper layer, forming, on said underlayer, a nonmagnetic granular layer of a granular structure comprising an inorganic oxide matrix and nonmagnetic metal crystal grains which are dispersed in said matrix and which have a crystal orientation directed in a predetermined orientation that depends on a crystal orientation of said underlayer, and forming, on said nonmagnetic granular layer, a magnetic recording layer comprising a ferromagnetic layer of a granular structure comprising an inorganic oxide matrix and magnetic crystal grains which are dispersed in said matrix and which have an easy magnetization axis directed in a predetermined orientation that depends on the crystal orientation of said metal crystal grains. With this structure, it is possible to obtain the same effect as that of Structure 1.

(Structure 14) A manufacturing method of a magnetic disk for use in perpendicular magnetic recording, said manufacturing method comprising forming, on a base, an underlayer for controlling a crystal orientation of an upper layer, forming, on said underlayer, a nonmagnetic granular layer of a granular structure comprising a matrix containing silicon or silicon oxide and nonmagnetic metal crystal grains which are dispersed in said matrix and which have a crystal orientation directed in a predetermined orientation that depends on a crystal orientation of said underlayer, and forming, on said nonmagnetic granular layer, a magnetic recording layer comprising a ferromagnetic layer of a granular structure comprising a matrix containing silicon or silicon oxide and magnetic crystal grains which are dispersed in said matrix so as to be contacted with said metal crystal grains in said nonmagnetic granular layer and which have an easy magnetization axis directed in a predetermined orientation that depends on the crystal orientation of said metal crystal grains. With this structure, it is possible to obtain the same effect as that of Structure 1.

(Structure 15) The metal crystal grains of said nonmagnetic granular layer are crystal grains containing at least cobalt and chromium and said nonmagnetic granular layer is formed at a temperature lower than a temperature of causing layer separation of cobalt and chromium in said metal crystal grains to occur.

(Structure 16) The magnetic crystal grains of said ferromagnetic layer are crystal grains containing at least cobalt and chromium and said ferromagnetic layer is formed at a temperature lower than a temperature of causing layer separation of cobalt and chromium in said magnetic crystal grains to occur.

According to Structures 15 and 16, the nonmagnetic granular layer and the ferromagnetic layer can be formed by a low-temperature process. Therefore, it is possible to prevent degradation in orientation of the magnetic recording layer, degradation in medium surface properties, and so on.

EFFECT OF THE INVENTION

In this invention, by providing a size-reduction promoting layer between an underlayer and a magnetic recording layer having a ferromagnetic layer of a granular structure, magnetic crystal grains in the ferromagnetic layer can be properly reduced in size. Further, by disposing a nonmagnetic granular layer under the ferromagnetic layer as the size-reduction promoting layer according to this invention, the ferromagnetic layer can be formed by a relatively low-temperature process.

BRIEF DESCRIPTION OF THE DRAWINGS

FIG. 1 An example of the structure of a magnetic disk 10 according to an embodiment of this invention.

FIG. 2 A diagram for explaining in further detail a part of the magnetic disk shown in FIG. 1.

FIG. 3 A graph comparing the results of examples and comparative examples.

BEST MODE FOR CARRYING OUT THE INVENTION

Hereinbelow, an embodiment according to this invention will be described with reference to the drawings.

FIG. 1 shows an example of the structure of a magnetic disk 10 according to the embodiment of this invention. In this embodiment, the magnetic disk 10 comprises a base 12, an adhesive layer 14, a soft magnetic layer 16, an underlayer 18, a size-reduction promoting layer 20, a magnetic recording layer 22, a protective layer 24, and a lubricating layer 26 stacked in this order. The magnetic disk 10 may further comprise an amorphous seed layer between the soft magnetic layer 16 and the underlayer 18. The seed layer is a layer for improving the crystal orientation of the underlayer 18.

For example, when the underlayer 18 is formed by Ru, the seed layer serves as a layer for improving the c-axis orientation of the hcp crystal structure.

The base 12 may be a glass substrate for forming the respective layers of the magnetic disk 10 thereon. Glass of the base 12 may be, for example, aluminosilicate glass, alumi- noborosilicate glass, soda lime glass, or the like. Among them, the aluminosilicate glass is preferable. An amorphous glass or a crystallized glass can be used also. When the soft magnetic layer 16 is amorphous, the base 12 is preferably made of the amorphous glass. Using a chemically strengthened glass may be preferable because the rigidity is high.

The surface roughness of the main surface of the base 12 is preferably 6 nm or less in Rmax and 0.6 nm or less in Ra. Rmax and Ra are defined by the Japanese Industrial Standard (JIS). Such a smooth surface serves to keep a gap between the magnetic recording layer 22 being a perpendicular magnetic recording layer and the soft magnetic layer 16 constant. Thus, it is possible to form a suitable magnetic circuit across a head, the magnetic recording layer 22, and the soft magnetic layer 16.

The adhesive layer 14 is a layer for improving the adhesion between the base 12 and the soft magnetic layer 16 and is formed between the base 12 and the soft magnetic layer 16. Using the adhesive layer 14 is effective to avoid peeling of the soft magnetic layer 16. As a material of the adhesive layer 14, use can be made of, for example, a Ti-containing material. In view of practical use, the thickness of the adhesive layer 14 is preferably set to 1 nm to 50 nm.

The soft magnetic layer 16 serves as a layer for adjusting a magnetic circuit of the magnetic recording layer 22. The soft magnetic layer 16 is not particularly limited as long as it is made of a magnetic substance that exhibits soft magnetic properties and, for example, preferably has as a magnetic property a coercive force (Hc) of 0.01 to 80 oersteds and more preferably 0.01 to 50 oersteds. Further, it preferably has as a magnetic property a saturation magnetic flux density (Bs) of 500 emu/cc to 1920 emu/cc. The material of the soft magnetic layer 16 may be a Fe-based material, a Co-based material, or the like. For example, such a Fe-based soft magnetic material may be FeTaC-based alloy, FeTaN-based alloy, FeNi-based alloy, FeCoB-based alloy, or FeCo-based alloy while such a Co-based soft magnetic material may be CoTaZr-based alloy or CoNbZr-based alloy, an FeCo-based alloy soft magnetic material, or the like.

The thickness of the soft magnetic layer 16 is, for example, 30 nm to 1000 nm and preferably 50 nm to 200 nm. When the thickness is less than 30 nm, there is a case where it becomes difficult to form a suitable magnetic circuit across the head, the magnetic recording layer 22, and the soft magnetic layer 16, while, when the thickness exceeds 1000 nm, there is a case where the surface roughness increases. Further, when the thickness exceeds 1000 nm, there is a case where the sputtering film formation becomes difficult.

When magnetic field annealing is necessary for controlling magnetic domains of the soft magnetic layer 16, it is preferable to use a glass as the base 12. Since the glass base 12 is excellent in heat resistance, the heating temperature can be raised up.

The underlayer 18 serves as a layer for controlling the crystal orientation of the size-reduction promoting layer 20 and the magnetic recording layer 22 and contains, for example, ruthenium (Ru). In this embodiment, the underlayer 18 is formed by a plurality of layers. The underlayer 18 may include an interface which contacs the size-reduction promoting layer 20 and which is formed by Ru crystal grains.

The size-reduction promoting layer 20 is one example of a nonmagnetic granular layer. In this embodiment, the size-reduction promoting layer 20 is specified by a nonmagnetic CoCr—$SiO_2$ layer of a granular structure.

The magnetic recording layer 22 comprises a ferromagnetic layer 32, a magnetic coupling control layer 34, and an exchange energy control layer 36 stacked in this order on the size-reduction promoting layer 20. The illustrated ferromagnetic layer 32 is specified by a CCP—SiO₂ layer of a granular structure and contains CoCrPt crystal grains as magnetic crystal grains.

The magnetic coupling control layer 34 serves as a coupling control layer for controlling magnetic coupling between the ferromagnetic layer 32 and the exchange energy control layer 36. The magnetic coupling control layer 34 is formed, for example, by a palladium (Pd) layer or a platinum (Pt) layer. The thickness of the magnetic coupling control layer 34 is, for example, 2 nm or less and preferably 0.5 to 1.5 nm.

The exchange energy control layer 36 is a magnetic layer (continuous layer) which has an easy magnetization axis aligned substantially in the same direction as that of the ferromagnetic layer 32. By exchange coupling with the ferromagnetic layer 32, the exchange energy control layer 36 improves the magnetic recording properties of the magnetic disk 10. The exchange energy control layer 36 is formed by a multilayer film composed of alternate-layered films ([CoX/Pd]n) of cobalt (Co) or an alloy thereof and palladium (Pd) or alternate-layered films ([CoX/Pt]n) of cobalt (Co) or an alloy thereof and platinum (Pt). The thickness thereof is preferably 1 to 8 nm and more preferably 3 to 6 nm.

The protective film 24 is a protective layer for protecting the magnetic recording layer 22 from an impact by the magnetic head.

Further, the lubricating layer 26 is a layer for increasing lubricity between the magnetic head and the magnetic disk 10.

As a method of manufacturing the respective layers of the magnetic disk 10, it is preferable to perform the film formation by the sputtering method. Particularly, the DC magnetron sputtering method is preferable because the uniform film formation is enabled. For the same reason, it is preferable to use the in-line type film forming method.

FIG. 2 shows a detailed structure of the underlayer 18, the size-reduction promoting layer 20, and the ferromagnetic layer 32. In the underlayer 18, the interface contacting the size-reduction promoting layer 20 is made of Ru crystal grains 102. The size-reduction promoting layer 20 has a granular structure in which metal crystal grains 104 formed by CoCr crystal grains are dispersed in a silicon oxide (SiOx) matrix 106. The metal crystal grains 104 are separated from one another by the matrix 106 and each form a columnar shape so as to be crystallographically coupled to the Ru crystal grains 102.

The ferromagnetic layer 32 forms a granular structure in which magnetic crystal grains 108 formed by Co alloy crystal grains are dispersed in a silicon oxide (SiOx) matrix 110. The magnetic crystal grains 108 are separated from each other by the matrix 110 and each form a columnar shape so as to be crystallographically coupled to the metal crystal grains 104. Therefore, according to this embodiment, the magnetic crystal grains 108 can be properly reduced in size. Further, by the size reduction of the magnetic crystal grains 108, the magnetic properties (Hc, S/N ratio, etc.) of the magnetic disk 10 (see FIG. 1) can be improved.

Hereinbelow, this invention will be described in detail by giving examples and comparative examples.

EXAMPLE 1

Amorphous aluminosilicate glass was molded into a disk shape by direct press, thereby producing a glass disk. This glass disk was ground, polished, and chemically strengthened in order, thereby obtaining a smooth nonmagnetic disk-shaped base 12 in the form of a chemically strengthened glass disk. The surface roughness of the main surface of the base 12 was measured by an AFM (atomic force microscope). As a result, it has been found out that the main surface was a smooth surface specified by Rmax of 4.8 nm and Ra of 0.42 nm. By using an evacuated film forming apparatus, an adhesive layer 14 and a soft magnetic layer 16 were successively formed on the obtained base 12 in an Ar atmosphere according to the DC magnetron sputtering method.

In this event, the adhesive layer 14 was deposited by using a Ti target so as to form a Ti layer of 20 nm. On the other hand, the soft magnetic layer 16 was deposited by using a CoTaZr target so as to form an amorphous CoTaZr (Co:88 at %, Ta:7 at %, Zr:5 at %) layer of 200 nm.

The disk (magnetic disk 10) substrate for a perpendicular magnetic recording medium thus finished with the film formation up to the soft magnetic layer 16 was removed from the film forming apparatus and placed in an atmospheric atmosphere. The surface roughness of the obtained perpendicular magnetic recording medium disk substrate was measured in the same manner and the substrate had a smooth surface specified by Rmax of 5.1 nm and Ra of 0.48 nm. The magnetic properties of the disk substrate were measured by a VSM (Vibrating Sample Magnetometer) and, as a result, the coercive force (Hc) was 2 oersteds and the saturation magnetic flux density was 810 emu/cc, thus showing the suitable soft magnetic properties.

Using an evacuated single-wafer stationary facing type film forming apparatus, an underlayer 18, a size-reduction promoting layer 20, a ferromagnetic layer 32, a magnetic coupling control layer 34, an exchange energy control layer 36, and a protective layer 24 were formed in order on the obtained disk substrate in a low Ar (50 sccm) atmosphere according to the DC magnetron sputtering method. In this Example, the underlayer 18 has a two-layer structure with a first layer and a second layer.

In this process, at first, on the disk substrate, a layer made of amorphous NiTa (Ni:40 at %, Ta:10 at %) and having a thickness of 10 nm was formed as the first layer of the underlayer 18 and a Ru layer having a thickness of 10 to 15 nm was formed as the second layer.

Then, the size-reduction promoting layer 20 of 2 to 20 nm having a hcp crystal structure was formed using a target made of nonmagnetic CoCr—SiO₂ (CoCr:88 mol % (where Cr:40%), SiO₂:12 mol %). This target made of nonmagnetic CoCr—SiO₂ was prepared by mixing SiO₂ into CoCr and sintering them. Further, the ferromagnetic layer 32 of 15 nm having a hcp crystal structure was formed using a hard magnetic target made of CoCrPt—SiO₂. The composition of the target for forming the ferromagnetic layer 32 was Co:62 at %, Cr:10 at %, Pt:16 at %, SiO₂:12 at %. Further, there were formed the magnetic coupling control layer 34 in the form of a Pd layer and the exchange energy control layer 36 in the form of a [CoB/Pd]ₙ layer.

Then, by sputtering a carbon target using a mixed gas containing 30% hydrogen in Ar, the protective film 24 made of hydrogenated carbon was formed. Since the film hardness is improved in the form of hydrogenated carbon, it is possible to protect the magnetic recording layer 22 from an impact by a magnetic head.

Thereafter, a lubricating layer 26 made of PFPE (perfluoropolyether) was formed by the dip coating method. The thickness of the lubricating layer 26 was 1 nm. Through the manufacturing processes as described above, there was obtained a magnetic disk 10 being a perpendicular magnetic recording medium.

The static magnetic properties of the obtained magnetic disks 10 were evaluated using Kerr. For comparison with a conventional CoCrPt—SiO$_2$ medium with only a Ru underlayer, media free from nonmagnetic CoCr—SiO$_2$ film were prepared as comparative examples.

FIG. 3 is a graph comparing the results of the examples with the results of the comparative examples. In FIG. 3, a plot point indicated by ♦ represents a value of Hc measured when the film thickness of the Ru underlayer was fixed to 150 Å while the film thickness of the nonmagnetic granular layer CoCr—SiO$_2$ stacked thereon was changed, a plot point indicated by a black square represents a value of Hc measured when the film thickness of the Ru underlayer was fixed to 125 Å while the film thickness of the nonmagnetic granular layer CoCr—SiO$_2$ stacked thereon was changed, and a plot point indicated by a black triangle represents a value of Hc measured when the film thickness of the Ru underlayer was fixed to 100 Å and the film thickness of the nonmagnetic granular layer CoCr—SiO$_2$ stacked thereon was changed. Further, in FIG. 3, a plot point indicated by x represents a value of Hc in the case of only a Ru underlayer with no nonmagnetic granular layer CoCr—SiO$_2$ stacked thereon, wherein only the film thickness of the Ru underlayer was changed. As shown in FIG. 3, it is seen that when the total film thickness of the Ru underlayer and the nonmagnetic granular layer is 250 Å, there is obtained a coercive force Hc which is about three times larger than that of the conventional medium only with the Ru underlayer of the comparative example. Further, the R/W characteristics of both were examined and there was observed an improvement in S/N ratio by about 10 dB to 15 dB.

While this invention has been described in terms of the exemplary embodiments, the technical scope of the invention is not limited to the scope of the description of the foregoing exemplary embodiments. It is obvious to a person skilled in the art that various variations or improvements can be added to the foregoing embodiment. It is clear from the description of claims that the modes added with such changes or improvements can also be included in the technical scope of this invention.

INDUSTRIAL APPLICABILITY

This invention is suitably applicable to a magnetic disk, for example, adapted to be mounted in a perpendicular magnetic recording type HDD (hard disk drive) or the like.

The invention claimed is:

1. A perpendicular magnetic recording disk for use in perpendicular magnetic recording, said perpendicular magnetic recording disk: comprising:
a base;
an underlayer formed over said base for controlling a crystal orientation of an upper layer;
a nonmagnetic granular layer of a granular structure formed on said underlayer; and
a magnetic recording layer comprising a ferromagnetic layer of a granular structure formed on said nonmagnetic granular layer;
wherein said nonmagnetic granular layer comprises:
an inorganic oxide matrix; and
nonmagnetic metal crystal grains which are dispersed in said matrix of said nonmagnetic granular layer and which have a crystal orientation directed in a predetermined orientation that depends on a crystal orientation of said underlayer; and
said ferromagnetic layer comprises:
an inorganic oxide matrix; and
magnetic crystal grains which are dispersed in said matrix of said ferromagnetic layer and which have an easy magnetization axis directed in a predetermined orientation that depends on the crystal orientation of said metal crystal grains;
wherein the nonmagnetic metal crystal grains of the nonmagnetic granular layer include at least one metal element comprising at least Co or Cr included in the magnetic crystal grains in the ferromagnetic layer;
wherein the magnetic recording layer further comprises:
a magnetic coupling control layer on the ferromagnetic layer; and
an exchange energy control layer which is formed on the magnetic coupling control layer and differs in composition from said ferromagnetic layer;
wherein the magnetic coupling control layer controls magnetic coupling between the ferromagnetic layer and the exchange energy control layer and aligns an easy magnetization axis of the ferromagnetic layer and the exchange energy control layer; and
wherein the magnetic coupling control layer is formed by Pd or Pt and the exchange energy control layer is formed by a multilayer composed of alternate-layered films.

2. A perpendicular magnetic recording disk as claimed in claim 1, wherein the at least one metal element includes either cobalt or chromium.

3. A perpendicular magnetic recording disk as claimed in claim 1, wherein the at least one metal element includes both cobalt and chromium.

4. A perpendicular magnetic recording disk as claimed in claim 1, wherein the underlayer includes ruthenium.

5. A perpendicular magnetic recording disk for use in perpendicular magnetic recording, said perpendicular magnetic recording disk: comprising:
a base;
an underlayer of ruthenium formed over said base for controlling a crystal orientation of an upper layer;
a nonmagnetic granular layer of a granular structure formed on said underlayer of ruthenium; and
a magnetic recording layer comprising a ferromagnetic layer of a granular structure formed on said nonmagnetic granular layer;
wherein said nonmagnetic granular layer comprises:
an inorganic oxide matrix; and
nonmagnetic metal crystal grains which are dispersed in said matrix of said nonmagnetic granular layer and which have a crystal orientation directed in a predetermined orientation that depends on a crystal orientation of said underlayer; and
said ferromagnetic layer comprises:
an inorganic oxide matrix; and
magnetic crystal grains which are dispersed in said matrix of said ferromagnetic layer and which have an easy magnetization axis directed in a predetermined orientation that depends on the crystal orientation of said metal crystal grains;
wherein the magnetic recording layer further comprises:
a magnetic coupling control layer on the ferromagnetic layer; and
an exchange energy control layer which is formed on the magnetic coupling control layer and differs in composition from said ferromagnetic layer;
wherein said exchange energy control layer is a multi-layer film composed of alternate layer films where the entire multi-layer film has a thickness in the range of 1 nm to less than 5 nm; and
wherein the magnetic coupling control layer controls magnetic coupling between the ferromagnetic layer and the exchange energy control layer and aligns an easy magnetization axis of the ferromagnetic layer and the exchange energy control layer.

6. A perpendicular magnetic recording disk as claimed in claim 5, wherein the nonmagnetic metal crystal grains of the nonmagnetic granular layer include at least one metal element comprising at least Co or Cr included in the magnetic crystal grains in the ferromagnetic layer.

7. A perpendicular magnetic recording disk for use in perpendicular magnetic recording, said perpendicular magnetic recording disk: comprising:
a base;
an underlayer of ruthenium formed over said base for controlling a crystal orientation of an upper layer;
a nonmagnetic granular layer of a granular structure formed on said underlayer of ruthenium; and
a magnetic recording layer comprising a ferromagnetic layer of a granular structure formed on said nonmagnetic granular layer;
wherein said nonmagnetic granular layer comprises:
an inorganic oxide matrix; and
nonmagnetic metal crystal grains which are dispersed in said matrix of said nonmagnetic granular layer and which have a crystal orientation directed in a predetermined orientation that depends on a crystal orientation of said underlayer; and
said ferromagnetic layer comprises:
an inorganic oxide matrix; and
magnetic crystal grains which are dispersed in said matrix of said ferromagnetic layer and which have an easy magnetization axis directed in a predetermined orientation that depends on the crystal orientation of said metal crystal grains;
wherein the magnetic recording layer further comprises:
a magnetic coupling control layer on the ferromagnetic layer; and
an exchange energy control layer which is formed on the magnetic coupling control layer,
wherein the magnetic coupling control layer controls magnetic coupling between the ferromagnetic layer and the exchange energy control layer and aligns an easy magnetization axis of the ferromagnetic layer and the exchange energy control layer,
wherein said nonmagnetic granular layer is formed by a nonmagnetic layer of Co, Cr, and $SiO_2$ while the ferromagnetic layer contains CoCrPt crystal grains and has a granular structure formed by Co, Cr, Pt, and $SiO_2$, and
wherein the magnetic coupling control layer is formed by Pd or Pt while the exchange energy control layer is formed by a multilayer composed of alternate-layered films.

8. A perpendicular magnetic recording disk as claimed in claim 7, wherein the alternate-layered films of the exchange energy control layer include a layer of a cobalt or its alloy and a layer of palladium or platinum.

9. A perpendicular magnetic recording disk for use in perpendicular magnetic recording, said perpendicular magnetic recording disk: comprising:
a base;
an underlayer formed over said base for controlling a crystal orientation of an upper layer;
a nonmagnetic granular layer of a granular structure formed on said underlayer; and
a magnetic recording layer comprising a ferromagnetic layer of a granular structure formed on said nonmagnetic granular layer;
wherein said nonmagnetic granular layer comprises:
an inorganic oxide matrix; and
nonmagnetic metal crystal grains which are dispersed in said matrix of said nonmagnetic granular layer and which have a crystal orientation directed in a predetermined orientation that depends on a crystal orientation of said underlayer; and
said ferromagnetic layer comprises:
an inorganic oxide matrix; and
magnetic crystal grains which are dispersed in said matrix of said ferromagnetic layer and which have an easy magnetization axis directed in a predetermined orientation that depends on the crystal orientation of said metal crystal grains;
wherein the nonmagnetic metal crystal grains of the nonmagnetic granular layer include at least one metal element comprising at least Co or Cr included in the magnetic crystal grains in the ferromagnetic layer;
wherein the magnetic recording layer further comprises:
a magnetic coupling control layer on the ferromagnetic layer; and
an exchange energy control layer which is formed on the magnetic coupling control layer and differs in composition from said ferromagnetic layer;
wherein the magnetic coupling control layer controls magnetic coupling between the ferromagnetic layer and the exchange energy control layer and aligns an easy magnetization axis of the ferromagnetic layer and the exchange energy control layer,
wherein said exchange energy control layer comprises multiple films that are alternately layered.

10. A perpendicular magnetic recording disk as claimed in claim 1, wherein said exchange energy control layer has a thickness in the range of 1 nm to less than 5 nm.

11. A perpendicular magnetic recording disk as claimed in claim 1, wherein said exchange energy control layer comprises (1) alternate layered films of cobalt or an alloy thereof and palladium or (2) alternately layered films of cobalt or an alloy thereof and platinum.

12. A perpendicular magnetic recording disk for use in perpendicular magnetic recording, said perpendicular magnetic recording disk: comprising:
a base;
an underlayer of ruthenium formed over said base for controlling a crystal orientation of an upper layer;
a nonmagnetic granular layer of a granular structure formed on said underlayer of ruthenium; and
a magnetic recording layer comprising a ferromagnetic layer of a granular structure formed on said nonmagnetic granular layer;
wherein the combined thickness of the underlayer and the nonmagnetic granular layer is in the range of 150 Å-300 Å
wherein said nonmagnetic granular layer comprises:
an inorganic oxide matrix; and
nonmagnetic metal crystal grains which are dispersed in said matrix of said nonmagnetic granular layer and which have a crystal orientation directed in a predetermined orientation that depends on a crystal orientation of said underlayer; and
said ferromagnetic layer comprises:
an inorganic oxide matrix; and magnetic crystal grains which are dispersed in said matrix of said ferromagnetic layer and which have an easy magnetization axis directed in a predetermined orientation that depends on the crystal orientation of said metal crystal grains;
wherein the magnetic recording layer further comprises:
a magnetic coupling control layer on the ferromagnetic layer; and an exchange energy control layer which is formed on the magnetic coupling control layer and differs in composition from said ferromagnetic layer; and wherein the magnetic coupling control layer controls magnetic coupling between the ferromagnetic layer and the exchange energy control layer and aligns an easy magnetization axis of the ferromagnetic layer and the exchange energy control layer, wherein said exchange energy control layer comprises multiple films that are alternately layered.

13. A perpendicular magnetic recording disk as claimed in claim 5, wherein said exchange energy control layer comprises (1) alternate layered films of cobalt or an alloy thereof and palladium or (2) alternately layered films of cobalt or an alloy thereof and platinum.

* * * * *